3,098,037
PORTABLE TILTABLE SEPARATOR
Burl D. Tonjes, Malinta, and Robert A. Cline, Napoleon, Ohio, assignors to The Gilson Screen Company, Malinta, Ohio, a partnership
Filed Mar. 14, 1960, Ser. No. 14,742
19 Claims. (Cl. 209—260)

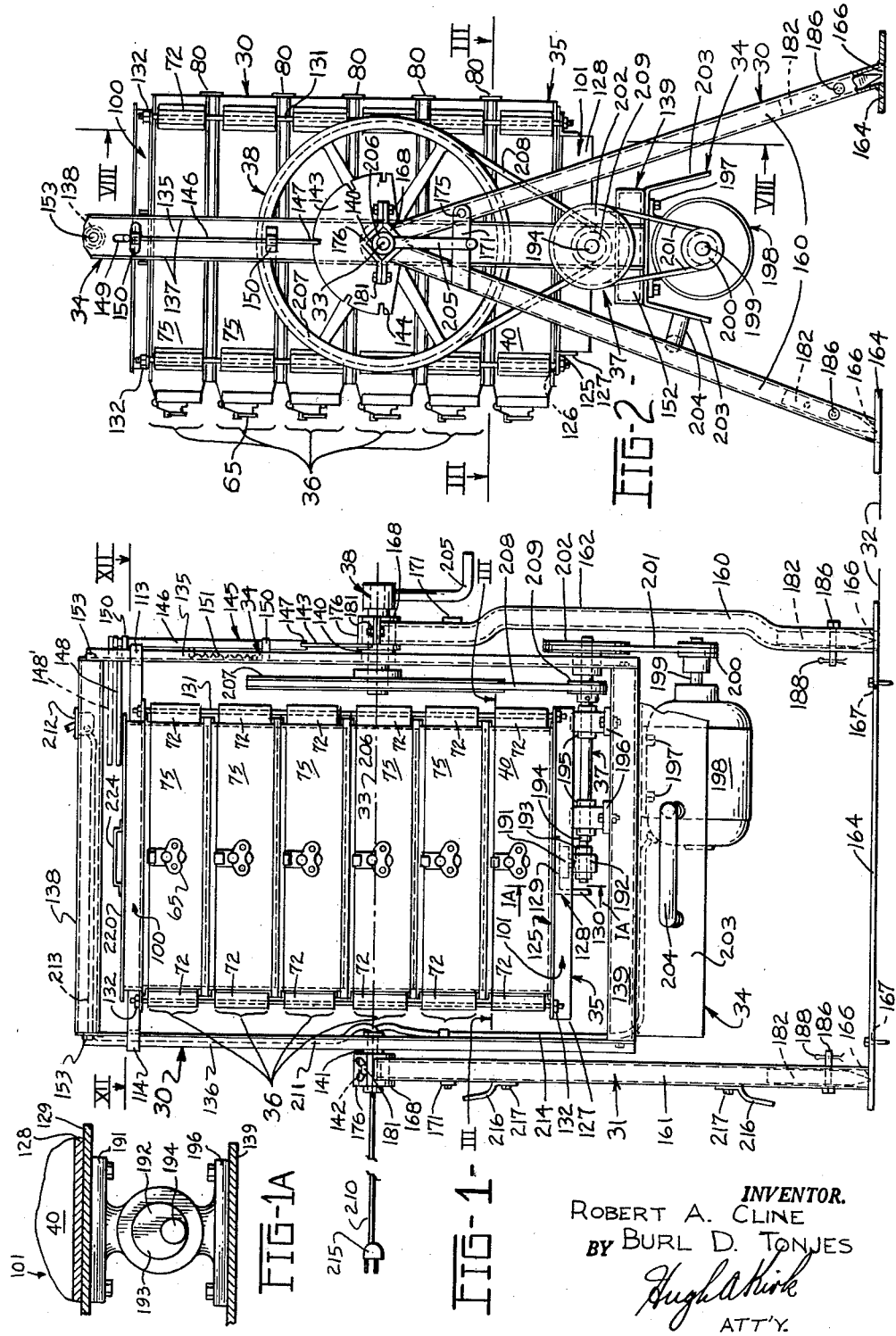

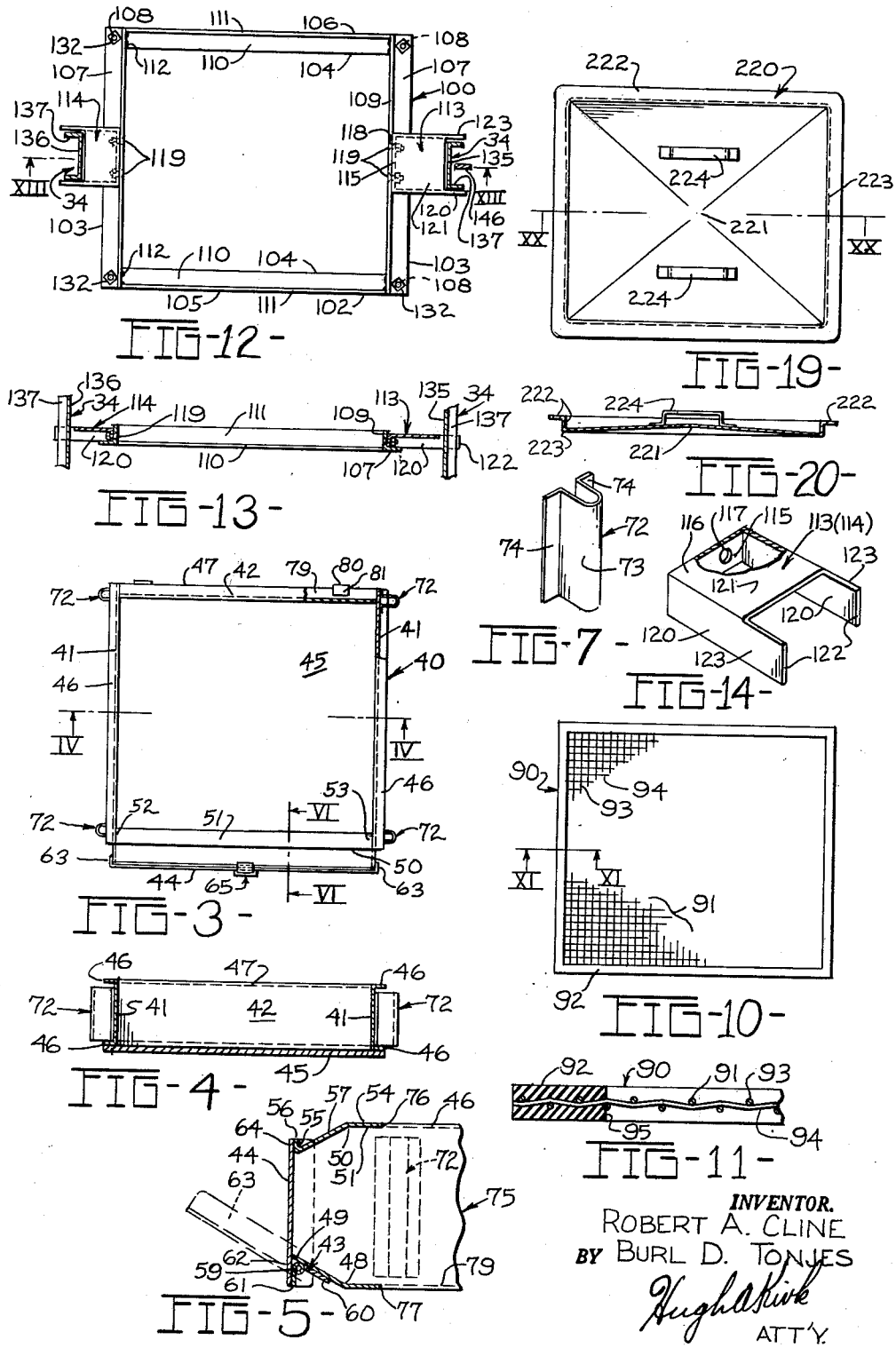

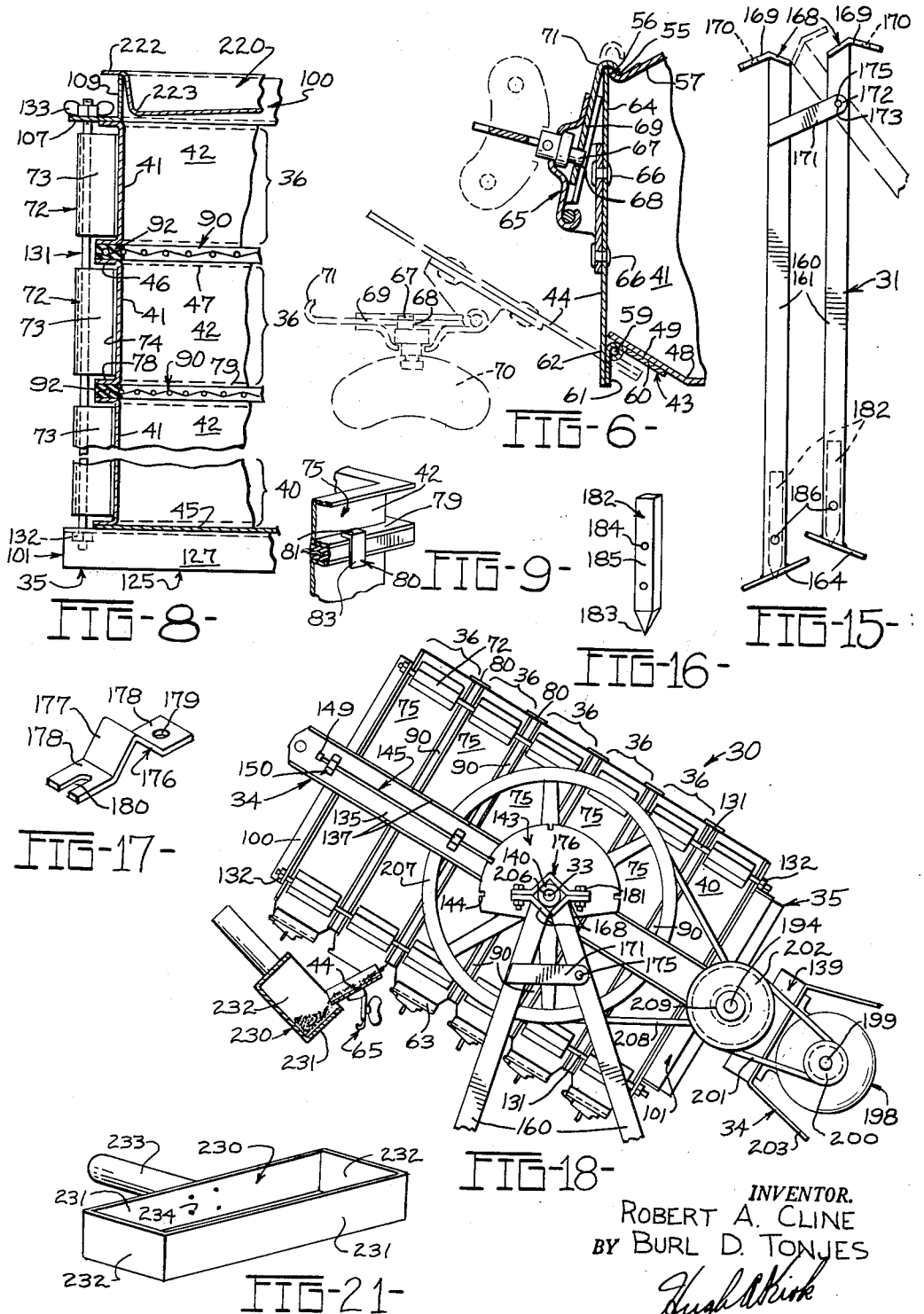

This invention relates to sifters and sorters. More particularly, it relates to sifters and sorters which separate material into size graded components and which operate by vertical reciprocation of the screen-bottom units, wherein the screen-bottom units are arranged in tiers, and wherein tiered assembly may be rocked to increase the sifting action of the device.

For many years use has been made of mesh screens to sift and sort certain size particles from the body of a large group of material. The basic operation of mechanisms for sorting and sifting, in many cases arranged in stages, makes use of a variety of motions to move the material over the screen openings. These motions quite commonly are a vertical reciprocation, a transverse reciprocation, and sometimes a continuous rotary or oscillating rotary motion, and are imparted to the screen in an attempt to increase the speed with which the screen will pass the quantities to be sorted and sifted. Such motion is imparted to the screen to free the openings of the screen when material is packed in the screen-bottomed tray. Quite frequently the motions are combined, so that there can be vertical reciprocation with rotary motion. Often the line of reciprocation is inclined so that, as the apparatus is vibrated, material tends to fall over the screen surface. In practically all cases, the object of motion is to bring into contact with the screen a new group of particles of the body of the material to be sorted and separated, thus assuring a more complete and efficient sifting action. With only vertical or inclined reciprocation, the group of particles in contact with the screen tends to remain constant, and thus retards the speed with which the material passes through the device. What is needed is a method of continually presenting new particles to the screen openings so that those which are smaller than the openings may pass through, then those which do not pass through the openings may be removed so that a new supply of particles may be presented to the screen surface. To date, no really satisfactory method of clearing the apertures of the screen in a batch separator and of providing a fresh supply of particles to the screen openings has been accomplished for devices wherein a series of screens are arranged in a tier.

Also, as a matter of practicality the devices which exist, and which have existed in the past, whereby material is sifted by means of passing the material through a series of stacked screens, wherein the sizes of the screen openings decrease as the material passes through the device, are constructed so that to withdraw the fraction sorted by any given screen, it is necessary to dismantle the entire apparatus. This is particularly inconvenient when the removal of a particular size fraction which is in the middle or bottom of the stack is especially desired. To date, no batch device has been produced which permits withdrawal of a separated fraction from the middle or bottom of a stack of sifting elements without at least disconnecting or loosening all of the stack of sifting elements.

It is an object of this invention to produce a simple, efficient, effective, accurate, and economical wet and/or dry sifting and sorting device wherein the sifting screens are arranged in tiers.

It is another object of this invention to produce a tiered screen sifting and sorting device which provides a means of sifting and sorting a larger batch quantity of material than has normally been possible in the same size device in the past.

It is another object of this invention to provide a sifter and sorter which has a combination of motions which may continuously clear the screen openings so that new particles of material from the main body of material being sifted may be presented continuously to the screen openings, and which gives a self-cleaning action to the screen therein.

Another object of this invention is to provide a sifter and sorter which imparts vertical reciprocation combined with rocking motion to the screen tray elements of the device.

Another object of this invention is to provide a sifter and sorter device whereby a stacked tier of screen units may be rotated about an axis through the tier, and said tier may be locked or unlocked in any rotated position about said axis.

Another object of this invention is to provide a sifter and sorter which is easily dis-assembled and portable including a removable and collapsible stand.

Another object of this invention is to provide a stacked tier staged sifter in which the individual fraction separating stages may be emptied without dismantling the entire apparatus.

Still another object of this invention is to provide means for applying either manual or powered vertical reciprocation to such a device.

It is a further object of this invention to provide a staged stacked tier sifting apparatus wherein two or more screens may be used in conjunction with a given fraction or size separating stage of the unit, so that half sizes of particles may be separated at any given stage.

It is still a further object of this invention to provide a stacked tier sifting and sorting apparatus wherein any one or more or the number and/or type of sifting screens in the tier may be changed and/or cleaned without completely dismantling the entire apparatus.

And still another object of this invention is to provide a sifter and sorter wherein the screens are provided with edging so that partial openings are not encountered in the sifting screens.

Generally speaking, this invention embodies a series of screens arranged one above another, preferably in a manner wherein the size of the apertures in the screens decreases between the top and bottom of the arrangement. The screens may be formed with gasket edges aligned with the edges of the peripheral holes in the screen, and may be separated by spacer or cylinder units and may have a solid bottom tray at the bottom of the arrangement, wherein the smallest fraction passed by the series of screens may be collected. The series of screens and spacer units, and the bottom tray may be held between clamping members above and below the stack, by tie rods or through bolts inserted between the clamping members and cooperating with the bottom tray and spacer units. The combination of the spacer units, the screens, the bottom tray, and the clamping units may be movably mounted in an intermediate frame having transverse axles intermediate of the height of the combination and these axles may be mounted in a collapsible stand. Vertical reciprocation is imparted to the combination by means of an eccentric or similar motion imparting means which may be mounted on the underside of the lower clamping unit. Power may be supplied to this vertical reciprocating means by an electric motor which may be mounted on the underside of the intermediate frame, or by a manually actuated means or crank through one of the axles supporting the combination in the support or stand. The sifter tray combination and the intermediate frame may be freely removable from the collapsible stand for portability purposes. This sifter tray and intermediate frame combination may be rocked manually about the axles journalled in the stand, and means may be provided whereby this rockable combination may be locked into various vertical, inclined and horizontal positions throughout the arc in which said combination may be rocked. Also, the vertical reciprocating motion may be independent of the rocking motion which may be applied to the combination.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of one embodiment of this invention showing the tier of sifting elements in vertical position on the stand therefor;

FIG. 1A is an enlarged sectional view taken along line IA—IA in FIG. 1 showing the eccentric drive for the separator;

FIG. 2 is a right end view of the embodiment shown in FIG. 1;

FIG. 3 is a plan view of one of the bottom sifting elements and spacer or tray taken along line III—III of FIG. 1 or 2;

FIG. 4 is a sectional view of a sifting element spacer taken along line IV—IV of FIG. 3;

FIG. 5 is an enlarged sectional view of the openable front door side of the spacer as could be taken along line V—V of FIG. 3, with the door shown in open position in dotted lines;

FIG. 6 is a further enlarged sectional view of the front of a spacer similar to FIG. 5 as could be taken along line VI—VI of FIG. 3 showing the door locking device;

FIG. 7 is an enlarged perspective view of one of the corner guides for a sifter element spacer as shown in FIG. 1, 2, 3 or 4;

FIG. 8 is an enlarged vertical section taken along lines VIII—VIII of FIG. 2 with parts broken away, of the tier of sifting elements showing parts of the screens clamped between parts, spacers and part of the lid and the bottom element of the tier;

FIG. 9 is an enlarged perspective view of an aligning tab for a screen edge and adjacent spacer on a spacer with most of the spacer being broken away, as shown at the right edge of the tier in FIG. 2, and in dotted lines in FIG. 8;

FIG. 10 is a plan view of one of the screens insertable between two spacers of the tier as shown in FIG. 1, 2 or 8;

FIG. 11 is an enlarged sectional view taken along line XI—XI of FIG. 10 showing the gasket edging of each screen;

FIG. 12 is a sectional view taken along line XII—XII of FIG. 1 showing a plan of the top clamping member which holds the sifter elements and the side guides therefor;

FIG. 13 is a sectional view taken along line XIII—XIII of FIG. 12;

FIG. 14 is an enlarged perspective view with a part broken away of a guide for the top clamp member shown in FIG. 1, 12 or 13;

FIG. 15 is an end view of the stand for the embodiment shown in FIG. 2 in collapsible position;

FIG. 16 is an enlarged perspective view of the retractable ground engaging pin shown retracted in each leg of the stand shown in FIG. 1, 2 or 15;

FIG. 17 is an enlarged perspective view of an axle retained clip for the top of the stand shown in FIG. 1, 2 or 15;

FIG. 18 is an end view similar to FIG. 2 with the lower part of the stand broken away showing the tier of sifting elements in an inclined position and the side door of one of the spacers open dumping its contents into a scoop or container;

FIG. 19 is a plan view of a lid or cover for the tier of sifting elements shown in FIG. 1 or 8 and for the top clamp member shown in FIG. 12;

FIG. 20 is a sectional view of the lid taken along line XX—XX of FIG. 19; and

FIG. 21 is an enlarged perspective view of the handled scoop shown in FIG. 18 as may be used for receiving the contents from one of the sifter elements.

I. SUB-ASSEMBLIES IN GENERAL

Referring first to FIGS. 1 and 2, there is shown one embodiment of the portable sifting and sorting device 30 of this invention which comprises, as will be described in more detail later, a collapsible base or support 31 which may rest on the floor or ground 32 providing journals for a horizontal pivotal axis 33 along which is trunnioned a rockable intermediate frame 34 in which is reciprocated a tier or combination 35 of sifting elements 36. These sifting elements are clamped together in a tier between a top clamp member 100 and a bottom tray 101, and comprises alternate vertical walled spacers 75 and screens 90. The clamped tier 35 of sifting elements 36 may be reciprocated by the operation of an eccentric drive mechanism 37 mounted on the intermediate frame 34 which mechanism may be driven either by an electric motor 198 also mounted on the intermediate frame 34, or by a hand crank and pulley mechanism 38 mounted on the axis 33 through one of the trunnions which support the rockable intermediate frame 34.

II. RECIPROCATING SIFTER COMBINATION

A. *Bottom Tray*

To better understand the function and utility of the various parts of the sifter 30, it may be advantageous to describe basically the operation of the reciprocating sifter combination 35. Material comprised of varying sized particles may be fed into the upper portion of the sifter combination 35. Arranged substantially vertically in the combination 35, may be a series of rectangular sifting screens 90 separated by a series of rectangular spacer units 75. The mesh or screen openings in the screens 90 normally decrease in size from the top to the bottom of the sifter 30 so that the larger particles are removed first from the body of the material being sifted. Adjacent and below the lowermost or finest mesh screen 90 is a solid or closed bottom tray for receiving that fraction of the main body of material fed into the upper portion of the sifter 30 which is comprised of those particles small enough to pass through the openings of the lowermost screen.

FIGS. 3, 4, and 5 disclose one of the spacer units 75, but the spacer units are so similar to the bottom tray used in this device, that the description of one will apply to the other.

The bottom or receiver tray 40 (or any spacer 75) may be rectangular in shape and may have vertical sides 41, a vertical back surface 42, a hinged 43 front side 44 which may function as a door, and a solid, rather than a screened, rectangular bottom 45. In order that a screen 90 may be seated properly over the tray 40, horizontal flanges 46 may project outwardly, preferably at right angles, from the sides 41 along the upper edges of the sides 41. Similarly, a flange 47 may project, preferably at a right angle, from the upper edge of the back 42 of the tray 40. Similar flanges may be formed around the lower edges of the sides 41 and back 42 of the tray where the bottom 45 is joined to the sides 41 and edges 42. These flanges as shown in FIG. 4 result from the method of construction, spot-welded, used in the manufacture of one embodiment of the tray, but they may be deleted if some other method of manufacture is preferred since they serve no purpose in the proper adjustment and operation of the shifter combination 35.

At the front 44 of the tray 40 (or each spacer 75), the bottom or lower front flange may be transversely knuckled 48 upward producing a flange or lip 49 (see FIG. 5 or 6) on the bottom plate 45. Spanning the width of the tray 40 or spacer 75 at the upper front portion may be a longitudinally knuckled 50 top front strip or plate 51. The top front strip 51 may be joined at its ends 52 and 53 to the sides 41 of the tray or spacer so that the upper horizontal surface 54 of the strip or plate 51 is flush with the flanges 46 of the sides 41. The top front strip or plate 51 should be installed so that the knuckle 50 is convex upward. Adjacent the front edge 55 of the strip or plate 51, may be a lip flange 56 extending vertically upward from the sloped portion 57 of the strip or plate 51 formed by knuckle 50.

Referring to FIGS. 5 and 6 of the drawings, the hinge 43 is attached to the under surface 58 of the lip 49 of the lower front strip of the bottom plate 45 of the tray 40 (or spacer 75). The hinge 43 is comprised of a hinge pin 59 connecting unequal width leaves or plates 60 and 61, the longer 60 of these leaves being attached, preferably by spot welding, to the under surface 58 of the lip 49. The short leaf 61 of the hinge 43 may be attached, preferably by spot welding, to the lower portion 62 of the front or door 44 of the tray 40 (or spacer 75). The door 44 may have, at its ends, flanges 63 (see FIG. 3) which extend along the exterior of the sides 41 of the tray (or spacer 75) when the door is closed. The upper portion 64 of the door 44 cooperates with the upturned vertical flange 56.

FIG. 6 shows in detail a clasp 65 which may be used to secure the door 44 in its tray closing position. The clasp 65 may be secured to the door 44 by rivets 66. The clasp 65 may be of a type readily available on the commercial market, but in the embodiment of this invention shown, the clasp is comprised of an eccentric pin 67 working in a slot 68 in a sliding plate 69 such that, when the handle 70 is turned, the plate 69 moves reciprocably engaging the hook 71, formed integrally on the sliding plate 69, with the upper portion of the door 44 and the vertical flange 56 of the top front member 51 of the tray 40, thus maintaining the door 44 in a securely closed position.

Along the sides 41 of the tray 40 (and spacers 75) may be located guides 72 which may cooperate with the through bolts or tie rods 131 which may be run vertically of the tray 40 and spacers 75. One of the guides 72 is shown in perspective in FIG. 7, and may be comprised of a cylindrical portion 73 having a U-shaped cross-section and flanges 74 extending outwardly from the ends of the U at right angles. The length of the cylinder preferably may be less than the height of the side walls 41 of the tray 40 or spacers 75. The guides 72 may be attached to the sides 41 of the tray 40 by spot welding.

While the tray 40 may be fabricated and assembled in whatever manner is deemed most advantageous, it is suggested that the connections be made as tight as possible to prevent the escape of dust and finely divided material from the interior of the tray. In the example of the invention described above and below, the components are preferably fabricated of sheet metal and spot or arc welded together, but any acceptable and workable material may be used in the construction of the sifter 30 and subassembly combination 35.

II-B. *Screen Spacer Units*

The screen spacer elements or units 75 for use with the particular embodiment of the invention considered in this specification are essentially identical to the bottom or receiver tray means 40 described above in section II-A but for one basic exception.

Since the spacer units 75 are to be used to separate the screens 90 used for separating the material introduced into the sifter combination 35 into size-oriented fractions, and since the material passes through one screen to the next lowest of the sifter, the spacer units 75 differ from the bottom tray 40 in that they do not have a bottom 45 but form frame elements as shown best in FIGS. 5 and 8. To better describe the spacer units 75, the description of the receiver tray 40 should be borne in mind.

The upper front strip or plate 51 (see FIG. 5) has a rear edge 76 which extends transversely of the spacer 75. To obtain a spacer unit 75 from a receiver tray 40, the portion of the bottom 45 of the tray 40 which extends rearwardly of a line 77 on the bottom 45 lying substantially below the rear edge 76 of the top front plate 51 of the tray is removed. This removal of the bottom 45 of the receiver 40 is such that there are no interior projections in the spacer 75 rearwardly of line 77.

Because the spacer units 75 serve to clamp the screens in position, the exterior upper flanges 46 and 47 on the sides 41 and back 42 of the tray 40 and spacers 75 may be augmented by flanges 78 (see FIG. 8) along the lower exterior edges of the sides 41 of the tray (now a spacer unit 75) and by flange 79 (not shown) extending outwardly at a right angle from the lower edge of the tray back 42. It will be recalled that in the tray 40, these lower flanges were mentioned as being optional; here, in a spacer 75, they are essential.

To aid in the alignment of the spacers when the sifter is assembled, such as for changing the screens or after cleaning them, and to serve as stops for the screens 90 when they are inserted between the spacers 75 and between the lowermost spacer and the receiver tray 40, tabs 80 (see also FIG. 9,) may be installed on the lower flange 79 of the back 42 of the spacer unit 75. These tabs 80 may be formed of a strip of sheet metal having a flange 81 at one end extending at right angles. The flange 81 of the tab 80 may be spot welded 82 to the flange 79 of spacer 75 back 42 so that the body 83 of the tab 80 depends vertically from spacer 75 (see right side of FIG. 2 and top of FIG. 18). It is recommended that at least two of these tabs 80 be installed on each spacer 75 for best and easiest alignment.

Each spacer 75, like the receiver tray 40, has a clasp 65, hinged 43 and front door 44. The overall dimensions of the spacers 75 are the same as those of the receiver tray 40.

II-C. *The Sifting Screens*

In the use of the sifter and sorter 30, screens 90 of varying mesh size may be inserted between the spacer units 75 and the receiver tray 40 as described above. Thus the screens 90 may be rectangular with dimensions approximately equal to the overall outer dimensions of the spacers 75.

These screens 90 may comprise wire mesh 91 (see FIGS. 10 and 11) with a resilient edging 92 around the periphery of the screen. This edging 92 acts as a gasket between the rims of adjacent spacers 75 and the tray 40, and may be of rubber, vinyl plastic, or any acceptable resilient material.

The mesh 91 of the screen 90 may be made up of wires 93 parallel to one another and spaced at regular intervals intersecting at right angles other wires 94 parallel to each other and spaced at regular intervals. The edging 92 should be applied to a mesh 91 blank in such a way that the inner edge 95 of the edging strip 92 just makes contact with one of the wires 93 or 94 which runs parallel to inner edge 95 of that edging strip 92. This matching and mating of the edging 92 and the wires 93 or 94 of the mesh should be carefully adhered to to avoid any openings around the edge of the screen adjacent the edge 95 of the gasket type edging which are smaller than the openings in the central portion of the screen; or in other words, care should be taken to assure that all the openings in the edged 92 screen 90 are the same size. The uniformity of mesh openings is especially critical when careful testing and grading procedures are to be carried out using a sifter and sorter 30 as embodied in this invention.

The advantages of such a screen 90 are that its resilient edges also act as particle proof sealing gasket between the stages of the sorter and sifter and that no undersized particles are retained or remain in the fraction which is retained by any given screen or stage in a multi-stage sifter and sorter. This gasket edging strip 92 also strengthens the support for the wire mesh 91 of the screen and prevents separating and wrinkling of the wire at the edges of the screen. Another advantage of this edged screen 90 is that it may be removed, replaced, changed, or installed easily in a reciprocable sifter combination 35 as is disclosed in this invention, as will be described more fully later.

II-D. Screen Clamping Means

In operation of the sifter and sorter 30, the receiver tray 40, spacer units 75, and separating screens 90 may be held between upper 100 and lower 101 clamping members or means. The combination of elements comprised of the clamping members 100 and 101, and the elements 40, 75, and 90 held between them, may be reciprocated vertically, however, the driving means 37 for accomplishing this reciprocation will be described in subsequent sections V.

The upper clamping member 100 may ride or rest on the flanges 46, 47, and 54 of the uppermost spacer unit 75, and may resemble an open rectangular frame with guide projections at the sides as shown in FIGS. 12 and 13. The frame 102 of the upper clamping member 100 may be comprised of steel angle sections 103 along the sides of the frame 102 and members 104 along the front 105 and back 106 of the member 100 between the side members 103. While the frame 102 of the upper clamping member 100 is preferably constructed of rolled steel angle sections, any member which has rigidity may be substituted satisfactorily for the angles.

The side members 103 of the upper clamping means 100 may comprise a flat strip or flange 107 having apertures 108 in the ends of the flange thereof, which flange or flat strip portion 107 preferably may cooperate with flanges 46 of the spacer units 75 below it, and the apertures 108 preferably may cooperate or be aligned with the interior of the U-shaped cylindrical portion 73 of the guides 72 attached to the sides 41 of the spacer units 75 and tray 40. Along the inner portion of flange 107 may be a vertically extending flange portion 109 to give rigidity to member 103.

The transverse front and back members 104 of the frame 100 may have horizontal surfaces 110 which may cooperate with flange 47 at the rear of the spacer unit 75 and with the flat portion 64 of the upper strip or plate 51 at the front of the spacer unit 75. In conjunction with members 104 and flat horizontal surface 110, there may be a vertical flange 111 along either edge extending upwardly from flange 110 to impart rigidity to the frame 102. The members 104 may be joined at their ends to the interior portion of the ends of members 103, such as by weldments 112.

Arranged centrally of the side members 103 of the frame 102 may be guide yokes 113 and 114 extending outwardly from the center of frame 102. The two guides or yokes may be similar except that yoke 113 (on the right side in FIG. 12) may be longer than yoke 114, in order to provide room for the manual driving mechanisms 38 described later on that side of the sifter combination 35 in the rocking frame 34.

FIG. 14 shows a cut-away perspective view of one of the yokes 113 or 114. This yoke may have a mounting flange 115 across end 116 of the yoke 113 or 114, which may be vertical and carry apertures 117 in the flange 115. These apertures 117 may cooperate with apertures 118 in the vertical flange 109 of side members 103 of the upper clamping means 100 and may also cooperate with nut and bolt combinations 119 holding the yokes 113 and 114 to the frame 102 of the upper clamping means 100. Extending outwardly from the ends of mounting flanges 115 and away from frame 102, may be vertical guide flanges 120. To provide strength to the yoke, there may be a bridge, web, or body 121 extending from the flange 115 to a point intermediate of the ends 122 of flanges 120 between the upper edges of the opposite flanges 120. The outer portions 123 of flanges 120 between the edge 124 of web 121 and the ends 122 of guide flanges 120 may form a yoke or guide for cooperation with the vertical side members 135 and 136 of the intermediate carrier frame 34 shown in section in FIGS. 12 and 13 and to be described later. To provide for the difference in length of the yoke pieces 113 and 114, the length of the flanges 120 and the length of the web 121 may be varied.

The lower clamping member or means 101, in the reciprocating assembled sorter and sifter combination 35, lies below the receiver tray 40. It may resemble an H in shape with the legs of the H extending transversely of the receiver tray 40 and with the bar of the H running longitudinally fore and aft of the center of the receiver tray (see FIGS. 1 and 2). In the embodiment of the invention illustrated in the drawings, the lower clamping member 101 may be fabricated of unequal leg rolled angle sections and may be welded together.

Members 125, preferably of heavy rigid form, may form the legs of the H. These members should present a flat horizontal surface for cooperation with underside of the bottom 45 of the receiver tray 40 adjacent the front and back flanges 60 and 79, respectively, of the tray 40. The members 125 may carry apertures 126 (not shown in detail) at their ends which may cooperate and be aligned with the openings formed by the U-shaped portion 73 of guides 72 attached to the sides 41 of the tray 40. The members 125 may have depending flanges 127 along the edges which are interior of the H-shaped lower clamping member 101 for increasing the rigidity and strength of the members 125. The members 125 may be joined by a cross member 128 connected at its ends to the mid portions of the substantially parallel members 125. Cross member 128 may have a flat portion 129 supporting the receiver tray 40 and to which may be connected the vertical reciprocation driving means 37 to be described later. Again and preferably, cross member 128 may have a depending flange 130 to increase the strength of the member 128.

To hold the receiver tray 40, the spacer units 75, and the screens 90 in place between the upper and lower clamping members 100 and 101, tie rods or through bolts 131 may be inserted into the apertures 108 in the upper clamping member 100, through the openings in the interior of the U-shaped portions 73 of the guides 72 attached to the sides 41 of the receiver tray 40 and spacer units 75, and then through the apertures 126 in the member 125 of the lower clamping means 101. One or both ends of these tie rods 131 may be threaded to receive nuts 132 for tightening of the assembly. Special knurled or wing nuts 133 (see FIG. 8) may be provided instead of nuts 132 for simple hand tightening of the unit, if desired.

The tie rods 131 may have sufficient threads at their ends so that the nuts 132 or 133 may be loosened, but not removed, to such an extent that the spacer units 75 may be moved apart along the rods 131 so that the screens 90 may then be removed from the assembly for cleaning or repair without dismantling the entire apparatus of the sifter tier combination 35. After the screens 90 have been cleaned, changed, replaced and/or repaired, they may be inserted into the stack of spacer units 75, or different screens 90 with different meshes may be inserted into the apparatus to sift a different sample of material according to different objects and specifications. This feature, along with the feature of doors 44 on the separate spacer units 75 and on the receiver tray 40, provides a degree of utility and flexibility in a sifter and sorter 30 which has not been provided in the past.

III. INTERMEDIATE ROCKABLE CARRIER FRAME

The upper and lower clamping means 100 and 101, with the stack of spacer units 75, screens 90, and the receiver tray 40, that is, the reciprocable tier combination 35, may be mounted movably within a rockable carrier frame 34, which carrier frame 34 may in turn be tiltably mounted in a base or support 31 setting on the ground in the field, or on a floor 32 in a factory or testing laboratory.

This intermediate tilting or carrier frame 34 may be rectangular in shape and be of greater height and width than the height and width of the combination 35 mounted to reciprocate within it. Basically, the tilting frame 34 (see FIGS. 1 and 2) may be comprised of vertical side members or channels 135 and 136 having flanges 137 along their vertical sides, of a top cross member 138, preferably a piece of tubular material; which also may serve as a handle for manually rocking or tilting the frame 34; and of a bottom cross member 139 of substantial structural properties. Mounted between the lower clamping member 101 and the bottom cross member 139 of the tilting frame 135 may be the reciprocating driving mechanism 37 which imparts a substantially vertical reciprocating motion to the tier sifter combination 35 through the clamping means 101.

Each of the side members 135 and 136 of the tilting frame 34 may carry a hollow or tubular stub axle 140, 141, respectively, along the rocking axis 33, extending outwardly of the frame 34 like trunnions at approximately its mid-portion. Each axle 140, 141 may be bolted, screwed, or welded to the central portion of its corresponding side member 135 and 136 between their flanges 137. Each of these tubular axles 140, 141 may have a sleeve 142 rotatably journalled to it, which may ride in a seat 168 of the support, base or stand means 31 which will be described later. One of the sleeves 142 may have mounted rigidly upon it at right angles thereto a semicircular plate or sector 143 (see FIGS. 2 and 18) which may have notches 144 in its circular periphery.

On the same side of the tilting frame 35 as may be found the semicircular plate 143, a tilting release mechanism 145 may be installed along the outer face of the side member 135. This mechanism 145 may consist of a rod 146 having a widened lower end 147 and a right angle extension 148 extending through a vertical slot 149 in the upper portion of side member 135 just below the location where the top cross member 138 is connected between the side members 135 and 136. The rod 146 may be held on side member 136 by clips 150 in such a way that the rod may move longitudinally along the tilting frame side member 135. A spring 151 (see FIG. 1) may be employed between the side member 135 and the rod 146 to maintain the rod 146 in its extreme downward position. The widened lower end 147 of rod 146 may cooperate in the notches 144 of the semi-circular plate 143 to lock the tilting frame in a fixed position (see FIGS. 2 and 18). Since the sleeve 142 and its attached semi-circular plate 143 may be considered fixed with relation to the base support means 31, when the rod 146 is engaged in one of the notches 144 tilting frame 34 is constrained from moving relative to the base support means 31. If it is desired to change the position of the frame 35, the right angle extension 148 to the rod 146 may be lifted upward, or moved toward the top cross member 138 of the tilting frame 135, against the action of spring 151 (see dotted line position 148' in FIG. 1), disengaging the tilting release mechanism 145 from the multi-position sector lock plate 143, and then the frame 135 may be tilted manually to a new position, or the frame 135 may be rocked back and forth manually to aid in the sifting and sorting procedure of the screens 90 while tier combination 35 is reciprocating.

The bottom transverse tilting-frame member 139 shown in FIGS. 1 and 2, may be a heavy hollow structural member having a rectangular cross-section, but it may be any sturdy structural member such as an inverted channel or the like. It may have cover plates 152 at its ends, and may be welded to the unflanged or inner surfaces of the lower ends of the side members 135, 136. The top cross member 138 of the tilting frame 34 may be a hollow tube and may be connected to the side members 136 by bolts 153.

It has been stated previously that the reciprocable tier combination 35 is mounted in the tilting frame 135. Part of this mounting is accomplished by installing the upper clamping member 100 within the frame 34 so that the yoke portions 123 of flanges 120 of the yoke or guide pieces 113 and 114 of the upper clamping member 100 span the width of the vertical side members 135 and 136, respectively, of the tilting frame 34, so that they may slide vertically along the flanges 137 near the upper ends of the vertical side members 135 and 136 (see FIGS. 12 and 13).

IV. THE SIFTER SUPPORT OR BASE FRAME

The apparatus which has been described in detail thus far may be supported by a sifter support frame or base 31 shown in detail in FIGS. 15, 16, and 17, and generally in FIGS. 1, 2, and 18. This base or support frame 31 may be comprised of two pairs of legs 160 and 161, one of which pair 160 has a bowed out portion 162 (see FIG. 1) to provide space for the pulleys of the driving mechanism 37 when the frame 34 is being tilted or rocked, while the other pair of legs 161 may be straight, as shown. A pair of floor cross plates 164 may be attached at each of its ends to the lower end of one leg of each pair 160 and 161. These legs 160 and 161 as shown in FIG. 15 may be hollow and have a rectangular cross-section, but they may be formed from any member capable of supporting the apparatus 30. Aligned with the hollow lower end of each of the legs 160 and 161 may be apertures 166 which do not constrict or block the hollow of the legs 160 and 161. Additional and circular apertures 167 (see FIG. 1) also may be provided in the cross plates 164 so that the support frame 160 may be bolted or nailed to a foundation or floor 32, such as by screws, through these apertures 167.

The upper ends of the legs 160 and 161 may be cut at an angle and capped by axle support plates 168, which support plates 168 (see FIG. 15) may be flanged or bent back slightly toward the lower end of the legs, which flanged portion 169 may have an aperture 170 therein for a bolt.

Located somewhat below the axle support plates 168 on each pair of legs 160 and 161 there may be mounted hinge plates 171 for each pair of legs which may be rigidly attached to and extend at an angle upwardly and outwardly from one leg of the pair, at an angle so that the hinge plate 171 is parallel to the bolting flanges 169 of the axle support plates 168 attached to this same leg pair and extending oppositely therefrom. The hinge plate 171, at its end 172, may carry an aperture 173, which aligns with an aperture 174 (not shown) in the upper portion of each other leg of that pair for fastening a loose but permanent pivot or hinge pin 175 to connect the legs of that pair together. The aperture 174 in the one leg for the pivot 175 should be such a distance below the axle support plate 168 of that leg, so that when the legs of each pair 160 and 161 are moved about the hinge pin 175, the axle support plates 168 come together to form a V in which the sleeves 142 on the tubular axles 140 and 141 connected to the tilting frame 34 may rest (see also dotted line position in FIG. 15).

An axle retaining clip 176 (see FIG. 17) may be provided to enclose the sleeve 142 as it rests in the V formed at the upper end or apex of the support A frame 30. The axle retaining clip 176 may be formed of steel flat bar and may have a central portion 177 bent into a right angle with co-planar bolting portions 178, one having an aperture 179 therein, and the other an apex ended slot 180, which portions 178 extend from the central V shaped or right angle portion 177 at approximately a 45° angle. These clips 176 may be attached by bolts 181 extending through apertures 179 and slot 180 and through cooperating apertures 170 in the flanges 169 of axle support plate 168, for easy disassembling of the rockable and reciprocating frames 34 and 35 from the stand 31 for portability purposes. These bolts 181 may have knurled heads or wing nuts for easy demountability, and by having a slot 180 in only one of the flanges 179 of the clips 176, the clip 176 may be loosened sufficiently for removal of the axes 140 and 141 without being completely removed from the stand 31, leaving the bolt 181 through the aligned aperture 179 and 170 at the opposite end of the clip 176 loose but still together.

To facilitate setting up of the sifter and sorter 30 in soft ground or on uneven floors, spikes 182 (see FIG. 16) having points 183 at one end, may be carried in the cavities or hollow lower ends of the legs 160 and 161 of the support or base frame 31. These spikes 182 may have holes 184 drilled through their width at regular intervals along the length of their shanks 185, so that they may be held in the legs 160 and 161 by pins 186 (see FIG. 1) cooperating in holes or apertures 187 in the lower portions of the legs 160 and 161. These pins 186 may be retained in the holes 184 and 187 by clips or cotter pins 188 (see FIG. 1).

V. THE DRIVING AND RECIPROCATING MECHANISMS

A. *Eccentric Reciprocating Means*

Referring to FIGS. 1, 2 and 18, the general mechanism 37 for imparting a reciprocal motion to the screens 90 of the sorter and sifter combination 35 is shown. Connected to the underside of the horizontal flange 129 of the lower clamping member 101 may be an eccentric journalling member 191 having a circular hole 192, with an axis parallel to the planes of the tray 40 and screens 90. Inside this hole 192 may rotate an eccentric 193 comprised of a circular sleeve with an eccentric hole therein fixedly mounted on a shaft 194, which shaft 194 may be supported on and parallel to the bottom transverse member 139 of the tilting frame 34 by bearing sleeves 195 and blocks 196 connected to the upper surface of the bottom cross member 139. When the shaft 194 is caused to rotate by action of the motor 198 or the handcrank 205, the rotation of the eccentric 193 in the eccentric journalling members 191 causes the lower clamping member 101 to gyrate, and the upper clamping member 100 to reciprocate due to the guiding action of the yokes 113 and 114 sliding in cooperation with flanges 137 of the vertical side members 136 of the tilting frame 34, which restricts lateral or fore-and-aft movement of at least the upper screens. Should any fore-and-aft reciprocal motion be eliminated from the lower screens 90, the bearing sleeves 196 cooperating between shaft 194 and the bearing blocks 195 may be mounted eccentrically to the shaft 194 out of phase with the eccentric 193 journalled and functioning in member 191.

V–B. *Power Drive Means*

Mounted, by volts 197 or otherwise, on the underside of the bottom cross member 139 of the tilting frame 34 may be an electric motor 198 with a shaft 199 extending beyond the end or vertical side member 135 of the rockable frame 34 within the off-set portion 162 of the legs 160. On shaft 199 may be mounted a pulley 200 for a V-belt 201. The V-belt 201 may be tensioned on a pulley 202 which may be mounted on the shaft 194 also in the off-set portion 162 of the legs 160 which pulley 202 drives the eccentric sleeve 193. The diameter of the motor shaft pulley 200 preferably is less than the diameter of the shaft pulley 202 so that the combination of pulleys and belt 200, 201, and 202 acts as a speed reduction device.

The motor 198 may be mounted within a dust shield and/or splash guard 203, when the sample is washed with water, which may extend downward from the tilting frame 34 bottom cross member 139 on either or both sides of the motor 198. This shield or guard 203 may be fabricated of heavy sheet material, preferably sheet metal. Attached to one portion or side of the dust shield 203, preferably at the front or door 44 side of the sorter 30, there may be a carrying handle 204 which, when used with the handle-like tilting frame 34 top cross member 138, provides handy and convenient portability of the tilting frame 34 and its attendant driving apparatus as a subassembly separate from the support frame 160.

V–C. *Manual Drive Means*

In addition to the electrical power drive means 198 which may be installed as a part of the sorter 30 apparatus, a manually operated crank 205 also may be provided. If the sorter 30 is to be manually operated, the V-belt 201 may be removed from its pulleys 200 and 202 so that the operator of the sorter 30 need not work against the dead load of the motor 198.

The crank 205 may be removably connected to a shaft 206, which shaft 206 may be passed through the inside of the tubular axle member 140 connected to the central portion of tilting frame vertical side member 135. A bearing surface (not shown) may be provided between the axle 141 and the shaft 206. The shaft 206 may pass through the vertical side member 135 and have a large diameter pulley 207 affixed to it between the tilting frame 34 and the combination 35 of reciprocating elements. This pulley 207 may be fabricated to drive a V-belt 208 which in turn drives a smaller diameter pulley 209 which may be keyed or otherwise attached to the eccentric driving shaft 194 adjacent the pulley 202. Since the pulley 207 preferably is of greater diameter than pulley 209, a positive mechanical advantage and a speed increase occurs from shaft 206 to the eccentric driving shaft 194 enabling easy manual reciprocation of the combination 35 of sorter elements through the use of the crank 205.

V–D. *Wiring of the Sorter*

To supply power to the electric motor 198 and avoid interfering with the vertical reciprocating motion or the manually imparted rocking or tilting motion which may be imparted to the sorter elements, an electric conductor cord 210 (see FIG. 1) may be attached to the unit through the hollow portion of the tubular axle member 141 on the side of the device 30 opposite from the side which may carry the crank 205 operated shaft 206. The axles 140 and 141 are the most stationary portion of the tilting frame 34, hence the cord 210 will be flexed least if it is connected at this point.

As the cord 210 emerges from the tubular axle member 141 inside the tilting frame 34, it may be passed upwards 211 along the frame vertical side member 136 and into the interior of the tubular frame top cross member 138 to be connected to an on-off switch 212 mounted in the top cross member 138. From the switch 212, an electric conductor cord 213 may return through the tilting frame top cross member 138 to the vertical side member 136 on the same side of the sorter 30 as the cord 210 first entered the sorter 30. From the top cross member 138 the cord 213 may run downwards along the length of the vertical side member 136 and pass through the tilting frame bottom cross member 139 to connect with the motor 198. A circuit completing electric conductor cord 214 may then return to the tubular axle member 141 and pass from the sorter to electrical plug 215 on cord 210.

For stowage of the cord 210, cleats 216 may be bolted by bolts 217 to a leg 161 of the support frame or stand 31. The cleats 216 preferably are attached to one of the legs which is not offset.

VI. ACCESSORIES FOR THE SORTER

To aid in keeping dust produced by the sorting operation at a minimum and/or to retrieve it in the sample, a cover or lid 220 (see FIGS. 8, 19 and 20) may be provided for seating on the flange 109, 110 and 111 of the upper clamping member 100 and above the topmost spacer unit 75 in the stack of units 75 comprising the reciprocating combination 35. This lid 220 may be dished into a slight peak 221 at its center and may have off-set flanges 222 raised around the rim 223 of its rectangular shape. A pair of lifting handles 224 may be located on the top central portion of the lid. In the embodiment of the lid 220 shown in FIGS. 8, 19 or 20, sheet metal is the preferred material of construction, but any acceptable and workable material may be used.

When it is desired to empty the spacer units 75 or the receiver tray 40 after a sample of material has been operated on by the sorter 30, an emptying scoop 230 (shown in FIGS. 18 and 21) may be used. The scoop or tray 230 may be of simple construction resembling a rectangular solid with top face removed. The sides 231 and ends 232 preferably should be spaced apart at least as far as the height and width, respectively, of the front door 44 of the receiver tray 40 and spacer units 75, so that the opened door 44 may be inserted into the scoop 230 assuring that every particle retained in a given stage of the sorter 30 will be guided into the scoop 230. A tubular handle 233 may extend from one side 231 of the scoop, and may be spot welded at 234 to the side 231 of the scoop to facilitate handling and holding of the scoop 230 during dumping of one of the sorting stages as shown in FIG. 18.

VII. OPERATION OF THE SORTER

Assuming that the sorter 30 is assembled as shown in FIGS. 1 and 2 with the mesh of the screens 90 becoming finer toward the bottom of the unit and that it is desired to sort and separate a sample of material, say fine gravel, into eleven size oriented fractions. It will be observed from FIG. 1, that there are five screens 90 in the sorter 30 arranged between five spacer units 75 and one receiver tray 40, or five sifting elements 36. The sample of material to be operated upon may be introduced into the top or first spacer unit 75 and the lid 220 may be put on so that as little dust as possible escapes from the unit. The nuts 132 on the tie rods 131 should be tight so that no dust escapes from the unit where the screens 90 are seated in the reciprocable combination of elements 35.

The electric conductor wire plug 214 on line cord 210 may be inserted into an electrical power socket and switch 212 may be turned "on," causing the motor 198 to function and the eccentric 193 on shaft 194 to shake primarily by vertical reciprocation the combination 35 including the bearing 191 for the eccentric sleeve 193, the stack of spacer units 75, screens 90, receiver tray 40, and top and bottom clamping members 100 and 101 may then move vertically in reciprocal motion guided by the yoke pieces 113 and 114 moving along the flanges 137 of the side members 135 and 136 of the tiltable frame 34. As the sample is agitated in this manner, the small particles will fall downward until they encounter a screen 90 which has a mesh too fine to pass them; in such case the particles are retained in the spacer unit 75 immediately above that screen 90 at which they are stopped.

As the sample is sifted and sorted, more and more particles will be blocked by a given screen from passage through the unit. This will hinder the smaller particles from passing through the various screens. The vertical reciprocal motion in some measure keeps the particles moving about on the screens 90 so that the small particles may pass through the screens 90 and not be prevented from doing so by the larger particles retained by any given screen. Also the feature of not having any partial openings in the screens 90 adjacent the rubber edging 92 makes certain that no undersized particles are retained above a given screen 90.

To aid in the sifting operation, the operator may manually augment the movement of the combination 35 by pulling up on the lever 148 below the top cross member 138 of the tilting frame 135 and releasing the end 147 of the rod 146 from its notch 144 engaging position with the tilting lock disc 143. The operator may then manually relatively slowly tilt and rock the device 30 back-and-forth about the axis 33 of the axles 141 causing the material on the screens 90 to flow back-and-forth across the screen. This combined reciprocation and rocking movement assures that all of the particles of the sample roll over each other and flow from the front to back and vice versa of the screens 90 so that all of the particles of the sample are presented to the openings of the screens 90 and that a thorough and a complete sifting operation is performed, as well as permitting larger samples to be separated in each operation than could be separated by the shaking movement caused by the eccentric 193 above.

It was assumed in this example that eleven fractions were to be obtained from the illustrated six-stage embodiment of this invention. After the operator has decided that the sample has had enough sifting, he may tilt the sorter into a near horizontal position as shown in FIG. 18 and lock it in such a position in the proper notch 144 of the tilt locking disc 143. The first fraction of the eleven desired will be comprised of those large particles which may be retained above the screen 90 below the first spacer unit 75. The door 44 may be opened by operating latch mechanism 65 and this fraction may be emptied into a scoop 230 through the front of the spacer 75 with the front door 44 acting as a trough or cleat during the dumping. The reciprocating mechanism may be kept in operation during the dumping, if desired, to aid in the unloading process. The rest of the spacers 75 including the bottom receiver tray 45 may be unloaded separately in a similar manner to form the first five fractions of the eleven desired. The particles which passed through all the screens 90 to the receiver tray 40 comprises the remaining six fractions of the eleven desired from the sample originally fed into the sorter 30. These particles may be emptied from the tray 40 and retained for further treatment. The motor 198 may now be turned off if it has been running during the emptying process.

The sorter 30 may then be further tilted into a horizontal position, the nuts 132 on the tie rods 131 may be loosened, and the spacer units 75 may be spread apart releasing the screens 90 from being clamped by the spacers 75. The screens 90 originally installed in the sorter 30 may then be removed from the sorter 30 and a new set of screens 90, all of finer mesh than was previously used, may be inserted between the spacers 75 so that the finer meshes are toward the bottom of the stack of spacers 75 with the finest mesh screen being located between the bottom spacer 75 and the receiving tray 40. The screens 90 should be abutted against stops 80 at the rear of the spacers 75 to assure proper positioning of the screens 90. The nuts 132 may then be tightened thus securely clamping the new set of screens 90 in the stack of the reciprocable combination 35, and the combination 35 righted into a vertical position as shown in FIGS. 1 and 2.

The lid 220 may be removed from the upper clamping member 100 and the group of particles which had been emptied from the receiver tray 40 and which had been retained for further treatment may then be poured or dumped into the topmost spacer unit 75. When the cover has been replaced the motor 198 may again be turned "on" at switch 212 and this batch of particles may then be sorted into six more fractions, the sixth being comprised of those particles which are passed through all five of the screens 90 of both sets used and are collected in the receiver tray 40 at the bottom of the stack. Again, the reciprocating combination 35 of the sorter and sifter 30 may be manually rocked or tilted back-and-forth to augment the shaking motion imparted through the action of the eccentric 193. When the sample has been thoroughly operated upon, the remaining six fractions desired may be separately emptied in the same manner as described above.

If twelve or thirteen fractions, or an even number of half fractions, are to be made, an additional screen 90 of proper mesh may be inserted also between the upper clamping member 100 and the top flanged edge of the top spacer unit 75, thus enabling six known fractions and a residue fraction to be obtained each shaking or sorting operation.

Thus the operation and usability of the sorter 30 of this invention may be extended by merely changing the screens 90 of the device.

If the sorter is to be operated on a field test or in a location where there is no electricity availabe, the V-belt 201 connected to the motor 198 may be removed and power may be supplied to the eccentric 193 and reciprocating means by installing the hand crank 205 on the shaft 206 and turning it to drive the eccentric 193 through the pulleys 207 and 202 and V-belt 208.

While there is described above the principles of this invention in connection with specific apparatus, it is to be clearly understood that this description is made only by way of example and not as a limitation to the scope of this invention.

What is claimed is:

1. A particle sifter and sorter device, comprising: a reciprocable combination of a solid bottomed vertical walled tray, a plurality of open ended frames arranged in a tier over said tray, a plurality of separate sifting screens removably interspersed between said frames and said tray adjacent the open ends of said frames, clamping means spanning said tier of frames, said screens, and said tray, reciprocation means connected to said clamping means, means for driving said reciprocation means; a supporting means for said reciprocable combination, an intermediate frame encircling said combination between said clamping means and said supporting means, and axle means between said supporting means and said intermediate frame for rockably mounting said reciprocable combination.

2. A device according to claim 1 wherein said reciprocation means is also connected to said intermediate frame.

3. A device according to claim 1 wherein said driving means comprises an electric motor mounted on said intermediate frame, and said reciprocation means comprises an eccentric means.

4. A device according to claim 1 wherein said tray and each of said open ended frames has a hinged door on one side thereof.

5. A device according to claim 1 wherein each of said screens has a resilient edging around its periphery which acts as a gasket between abutting edges of said open ended frames.

6. A multistaged separating device comprising: an open ended tier comprised of a plurality of elements, said plurality of elements including a plurality of open top and open bottom spacer units having a door in each of said spacer units and a closed bottom open top doored receiver tray forming the bottom of said tier; a plurality of individual screen sections insertable between said spacer units and between the lowermost spacer unit and said receiver tray; clamping means spanning said tier and said screens interspersed in said tier reciprocation means for said tier connected to the bottom of said clamping means; a frame carrying and guiding said tier and said clamping means in their reciprocations and having said reciprocation means connected thereto, said frame having at least one pivot member for rockably tilting said frame about an axis perpendicular to the axis of said tier; and support means for said frame having a bearing for said pivot member.

7. A device according to claim 6 including electric motor drive means for said reciprocating means, and means for supplying power to said drive means along the axis of said pivot member.

8. A device according to claim 7 wherein said drive means includes separate means for manually operating said reciprocating means.

9. A device according to claim 7 wherein said reciprocation means comprises an eccentric means.

10. A device according to claim 6 including means on said frames and on said support for locking said frame in a plurality of positions which said frame may attain relative to said support by rotation about said pivot member.

11. A device according to claim 6 including retractable means associated with said support means for stabilizing said device to different type foundation surfaces.

12. A device according to claim 6 wherein said tier is of rectangular cross-section.

13. A device according to claim 6 wherein said screen sections have gasket type circumferential edges of a resiliently deformable material.

14. A device according to claim 6 wherein each of said screen sections comprises woven wire mesh providing uniform openings in said mesh; and comprise a peripheral edging arranged with respect to all the wires of said mesh in a manner ensuring that all the openings in said mesh within said edging are defined by said wires only and that said edged screen sections are free from partial openings.

15. A multi-staged separating device comprising: a plurality of mesh screens spaced from each other by vertical walled spacers arranged in a column separate from said screens, a receiver tray under said column, means clamping said spacers and said tray in tight relationship in said column, means for reciprocating said column along the axis of said column, each of said screens having a reinforced edge separate from said spacers, frame means encircling and carrying said column, means for pivotally supporting said frame means and column for rockable tilting movement, and means for connecting each of said spacers and said tray to said clamping means for maintaining the integrity of said column so that said spacers are separable within said clamping means and said reinforced screens are removable from said column independent of removal of said spacers.

16. A device according to claim 15 including means for mounting said column on an axis perpendicular to said axis of said column whereby said column may be rocked and tilted about said mounting axis.

17. A device according to claim 16 wherein each of said spacers and said tray has a door hinged thereon for emptying the portion within each said spacer and said tray when said door is open and said column is tilted to direct said open door downwardly.

18. A particle sifter and sorter device, comprising: a combination of a solid bottom vertically walled tray, a plurality of open ended frames arranged in a tier over said tray, a plurality of sifting screens interspersed between said frame and said tray adjacent the open ends of said frames, clamping means spanning said tier of frames, said screens, and said tray; and means to reciprocate said clamping means and the parts clamped thereby; a support for said combination, means for rockably mounting said combination in said support, means for removing said combination from said support, and means for collapsing said support.

19. A portable-multi-screen separator comprising: a collapsible stand, a horizontal pivot axle mounted on said stand, a tiltable supporting frame carried by said axle; a reciprocable assembly mounted by said supporting frame and including separate spaced screens, spacers between said screens, and separable means for clamping said screens and spacers together to permit removal and replacement of said screens independently of said spacers, each of said spacers having a flanged opening through which particles between adjacent screens may be dumped by tilting said supporting frame about said axle, and a door cooperating with each of said openings for controlling the discharge of such particles.

References Cited in the file of this patent

UNITED STATES PATENTS

| | | |
|---|---|---|
| 1,566,036 | Nachtscheim | Dec. 15, 1925 |
| 1,991,001 | Reynolds | Feb. 12, 1935 |
| 2,029,848 | Wettlaufer | Feb. 4, 1936 |
| 2,358,453 | Gilson | Sept. 19, 1944 |
| 2,511,239 | Behnke | June 13, 1950 |
| 2,663,423 | Wheeler | Dec. 22, 1953 |
| 2,690,841 | Warren | Oct. 5, 1954 |
| 2,973,865 | Cibula | Mar. 7, 1961 |

FOREIGN PATENTS

| | | |
|---|---|---|
| 44,332 | France | Dec. 24, 1934 |
| 784,916 | France | Jan. 29, 1935 |